(12) United States Patent
Inha et al.

(10) Patent No.: US 9,396,148 B2
(45) Date of Patent: Jul. 19, 2016

(54) SYSTEM METHOD FOR CONNECTING USB TYPE-C DEVICES BY MEASURING PREDETERMINED TEST PATTERNS BETWEEN A PLURALITY OF CONNECTED ACCESSORIES

(71) Applicant: Nokia Corporation, Espoo (FI)

(72) Inventors: Kai Inha, Jarvenpaa (FI); Juha Reinhold Backman, Espoo (FI); Pekka Talmola, Turku (FI); Timo J. Toivanen, Mantsala (FI)

(73) Assignee: Nokia Technologies Oy, Espoo (FI)

( * ) Notice: Subject to any disclaimer, the term of this patent is extended or adjusted under 35 U.S.C. 154(b) by 59 days.

(21) Appl. No.: 14/223,860

(22) Filed: Mar. 24, 2014

(65) Prior Publication Data
US 2015/0269102 A1    Sep. 24, 2015

(51) Int. Cl.
| | |
|---|---|
| *G06F 13/00* | (2006.01) |
| *G06F 13/38* | (2006.01) |
| *G06F 13/40* | (2006.01) |
| *G06F 13/42* | (2006.01) |

(52) U.S. Cl.
CPC .......... *G06F 13/385* (2013.01); *G06F 13/4022* (2013.01); *G06F 13/4256* (2013.01)

(58) Field of Classification Search
CPC ...................................... G06F 13/85
USPC ...................................... 710/14–19
See application file for complete search history.

(56) References Cited

U.S. PATENT DOCUMENTS

| | | | | |
|---|---|---|---|---|
| 5,938,742 | A * | 8/1999 | Faddell ............... | G06F 13/4256 710/260 |
| 6,035,344 | A | 3/2000 | Suzuki | |
| 8,195,857 | B2 * | 6/2012 | Barrenscheen ....... | H04L 12/403 326/37 |
| 2004/0064608 | A1 | 4/2004 | McLachlan | |

(Continued)

FOREIGN PATENT DOCUMENTS

| | | |
|---|---|---|
| AU | 690799 B2 | 4/1998 |
| CH | 683806 A5 | 5/1994 |
| DE | 102004057286 A1 | 6/2006 |

(Continued)

OTHER PUBLICATIONS

"Universal Serial Bus 3.0 Specification"; Nov. 12, 2008, pp. 1-482.*

(Continued)

*Primary Examiner* — Tammara Peyton
(74) *Attorney, Agent, or Firm* — Mintz Levin Cohn Ferris Glovsky and Popeo, P.C.

(57) ABSTRACT

In some example embodiments, there may be provided a method, which may include sending, by a user equipment, a first predetermined test pattern to a first accessory including a first connector, when the first accessory is in a first mode of operation; determining, by the user equipment, a configuration of the first accessory in the first mode by at least measuring a first time for the first predetermined test pattern to return from the first connector and a data loop at the first accessory; sending, by the user equipment, a second predetermined test pattern via at least the first connector; and determining, by the user equipment, a presence of a data loop extension, by at least measuring a second time for the second predetermined test pattern to return from the first connector and at least one of the data loop at the first accessory or the data loop extension.

10 Claims, 8 Drawing Sheets

(56) References Cited

U.S. PATENT DOCUMENTS

2011/0167176 A1    7/2011    Yew et al.
2013/0108063 A1\*   5/2013    Verhoeve ........... G01R 31/3187
                                                           381/58

FOREIGN PATENT DOCUMENTS

EP        0586715 A1    3/1994
GB        2327579 A     1/1999

OTHER PUBLICATIONS

"Universal Serial Bus 3.1 Specification"; Jul. 26, 2013, pp. 1-631.\*
B. H. Mohlenbein, "Interbus—Dezentrale Echtzeit—Peripherie fur Standard-SPS-Systyeme" 952 Elektrie, vol. 44, No. 7, pp. 244-249, 1990.
"Universal Serial Bus 3.0 Specification"; Nov. 12, 2008.
"Universal Serial Bus 3.1 Specification"; Jul. 26, 2013.

\* cited by examiner

SYSTEM METHOD FOR CONNECTING USB TYPE-C DEVICES BY MEASURING PREDETERMINED TEST PATTERNS BETWEEN A PLURALITY OF CONNECTED ACCESSORIES

FIELD

The subject matter described herein relates to interfaces including connectors.

BACKGROUND

Physical connectors, such as the connector used with the Universal Serial Bus (USB), can be used to couple devices. USB standards may be used to define physical and electrical aspects of USB. Examples of those standards include the Universal Serial Bus 3.1 Specification and Universal Serial Bus 3.0 Specification, as well as any additions, revisions, and updates thereto. More recently, the USB Type-C connector has emerged as a USB-type connector having a relatively small size and being configured so that the USB Type-C connector can be coupled without regard to plug orientation and/or cable direction.

SUMMARY

Methods and apparatus, including computer program products, are provided for connectivity.

In some example embodiments, there may be provided a method, which may include sending, by a user equipment, a first predetermined test pattern to a first accessory including a first connector, when the first accessory is in a first mode of operation; determining, by the user equipment, a configuration of the first accessory in the first mode by at least measuring a first time for the first predetermined test pattern to return from the first connector and a data loop at the first accessory; sending, by the user equipment, a second predetermined test pattern via at least the first connector; and determining, by the user equipment, a presence of a data loop extension, by at least measuring a second time for the second predetermined test pattern to return from the first connector and at least one of the data loop at the first accessory or the data loop extension.

In some variations, one or more of the features disclosed herein including the following features can optionally be included in any feasible combination. An extension control position at the data loop of the first accessory may be determined. The at least one control bit may be sent to the extension control position to enable extension of the data loop at the first accessory to the data loop extension. The extension control position may be determined based on the measured first time. The data loop extension may include a memory at the first accessory, and wherein the memory comprises information about the first accessory. The data loop extension may include a second data loop at a second accessory coupled to the first accessory. The first connector may include a universal serial bus Type-C connector. The first mode may include a special docking mode.

In some example embodiments, there may be provided an apparatus, which may include at least one input shift register; at least one output shift register, wherein the at least one input shift register and the at least one output shift register are coupled to a first connector; at least one switch configured to feed data from the at least one input shift register to the at least one output shift register when the at least one switch is in a first state, the at least one switch configured to feed data from the at least one input shift register to an extension output when the at least one switch is in a second state, wherein the at least one switch is controlled based on at least one bit at an extension control position at the at least one input shift register, the at least one output shift register, or a combination thereof.

In some variations, one or more of the features disclosed herein including the following features can optionally be included in any feasible combination. The extension output may be coupled to a memory including information about the apparatus, and wherein the memory may be further coupled to the at least one output shift register. The extension output may be coupled to a second connector.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
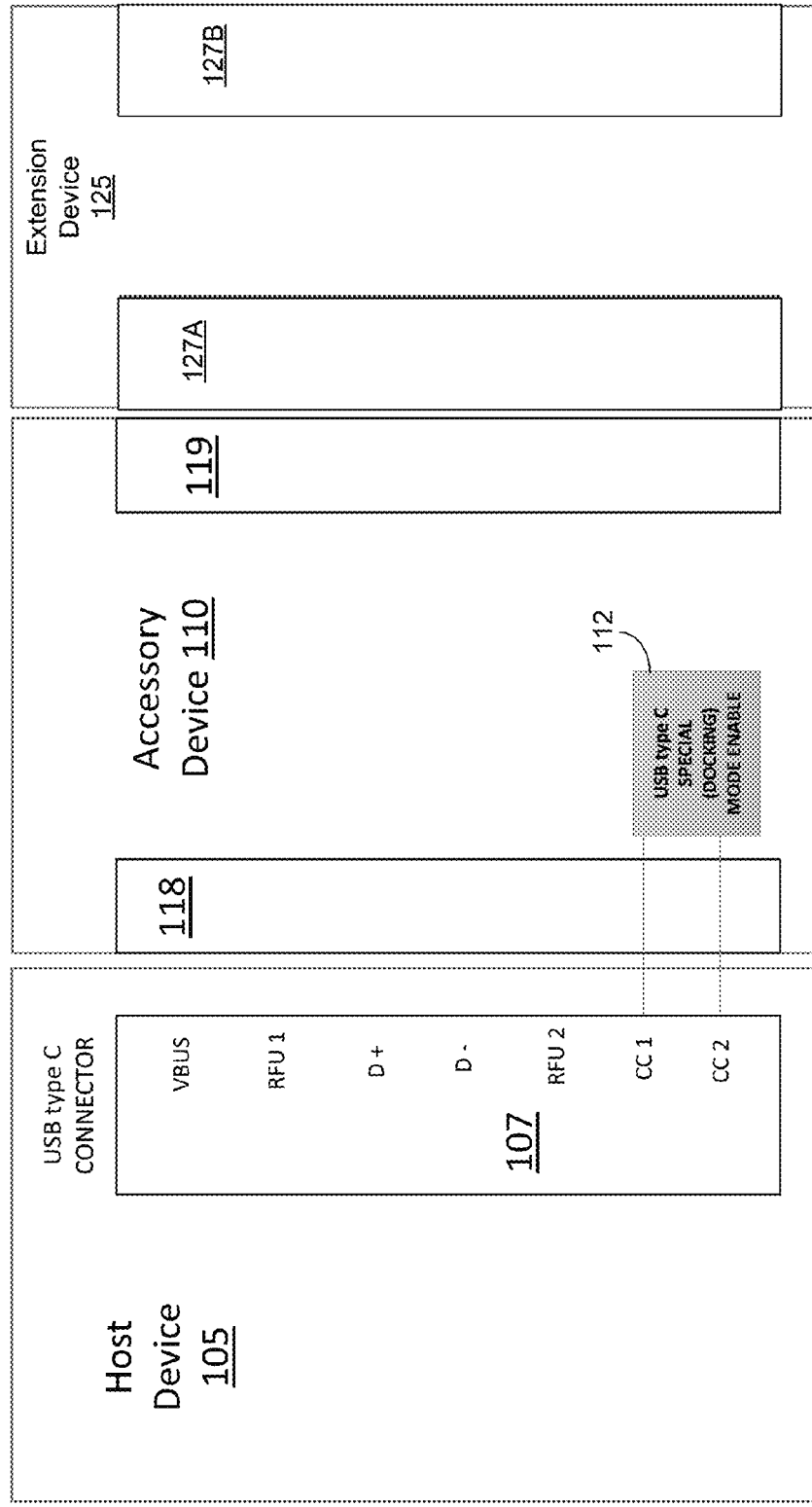
FIG. 1 depicts an example of a system including a host device, an accessory device, and an extension device, in accordance with some example embodiments.

Like labels are used to refer to same or similar items in the drawings.

DETAILED DESCRIPTION

Although some of the examples disclosed herein refer to certain types of universal serial bus (USB) accessories and interfaces including connectors, other types of accessories and interfaces may be used as well in accordance with the subject matter disclosed herein. Moreover, although some of the examples show a certain pin out arrangement, other arrangements may be used as well.

FIG. 1 depicts an example system 100 including a USB Type-C connector 107 at a host device 105, an accessory device 110 having a USB Type-C connector 118 coupling into connector 107, and another accessory device 125 (labeled extension device) having a USB Type-C connector 127A coupling directly into USB Type-C connector 119 at accessory device 110. Accessory device 125 may include another USB Type-C connector 127B to enable other extension devices to couple to connector 127B. Although FIG. 1 depicts a single extension device 125, one or more other extension devices may be coupled via the USB Type-C connector interface as well.

Host 105 may be implemented as a user equipment, such as a smartphone, an audio device, a video device, and/or any other device.

The accessory device 105 may be implemented as a digital audio headset and/or any other accessory having a connector, such as a USB Type-C and the like. In some example embodiments, accessory 110 may be configured to identify itself to host 105 as being in a certain mode of USB Type-C. Specifically, accessory 110 may be configured in a special mode, referred to herein as a special docking mode. The special docking mode 112 may allow for pin(s) (and/or functions of the pin(s)) at connectors 107 and/or 118 to be defined, configured, and/or re-configured by a manufacturer or user. As such, the functions/pin arrangement at connector 107 may, while in the special mode, be re-configured by a given manufacturer or user to operate in a predetermined way as disclosed herein.

Figure 2A:
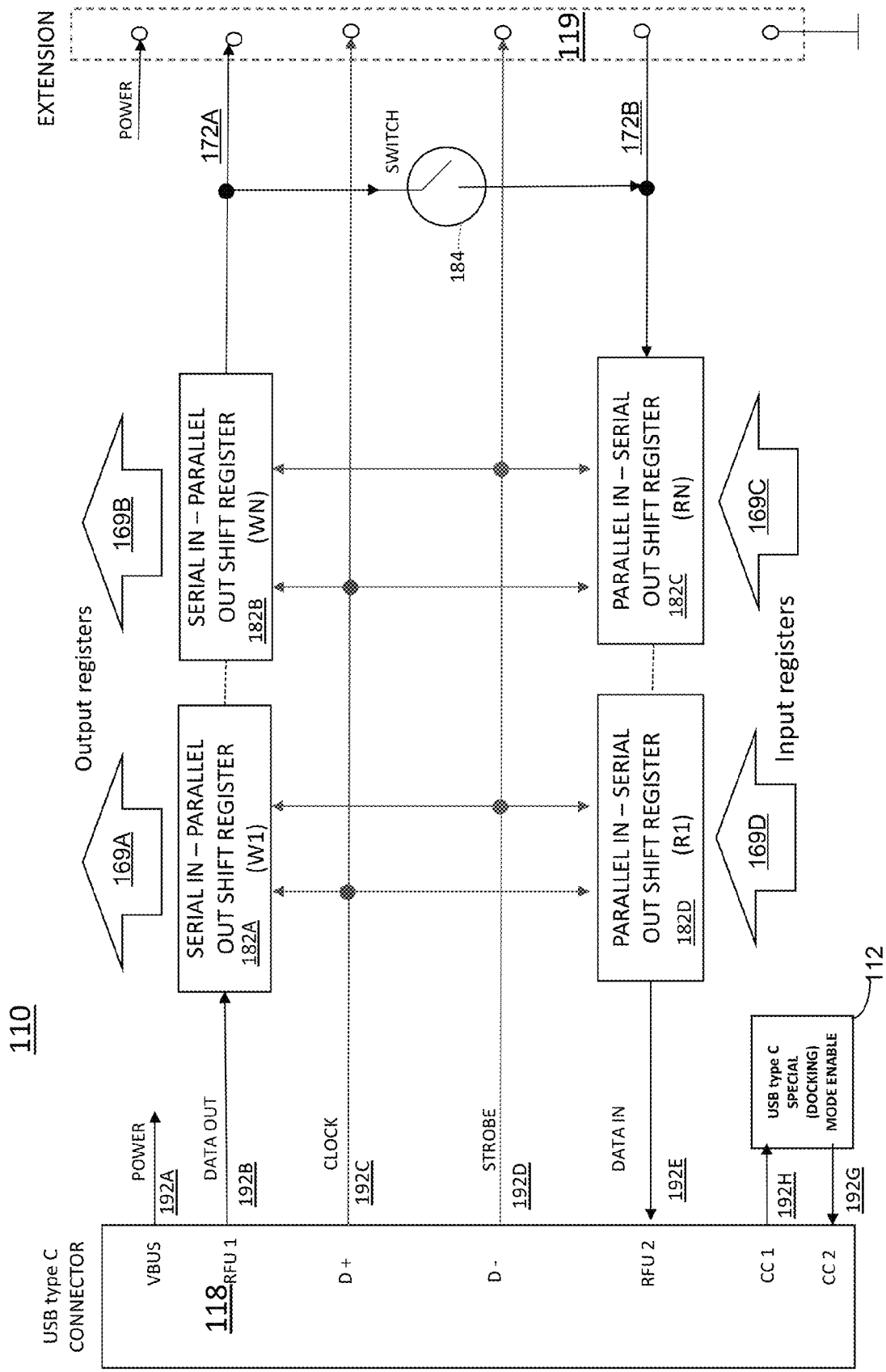
FIG. 2A depicts an example of an accessory device, in accordance with some example embodiments.

FIG. 2A depicts an example implementation of accessory 110, in accordance with some example embodiments.

The USB Type-C connector 118 may include one or more of the following: a power bus 192A labeled (VBUS) for providing power, a data out pin 192B (labeled RFU 1), a clock 192C (labeled D+), a strobe 192D (labeled D−), a data in pin 192E (labeled RFU 2), and control pins 192G and H where accessory 110 may signal modes, such as the special docking mode 112 and the like. Although VBUS is described in some of the examples disclosed herein, other interfaces (for example, VCONN and the like) may be used as well.

In the example of FIG. 2A, accessory 110 may include one or more pairs of shift registers 182A-D, although other quantities of shift registers may be used as well. The accessory 110 may also include a switch 184 that can be configured to close in order to connect shift registers 182A-B to shift register 182C-D to form a loop comprising connector 118, data out line 192B, shift registers 182A-B, switch 184, shift registers 182C-D, and data out line 192E/connector 118.

FIG. 2A depicts pairs of shift registers which are used to read and write data, in accordance with some example embodiments. For example, shift register 182C may be implemented as a parallel-in-serial-out shift register that takes the data at input register 169C and places it serially on the loop coupled to the data in pin/line 192E. In the case of shift register 182A, it may be implemented as a serial-in-to-parallel-out shift register that takes data from the loop and places it on output buffer 169A. To illustrate with another example, registers 182A-D may be coupled to other circuitry, such as stereo output audio circuitry, control circuitry, a microphone, and the like. When this is the case, host 105 may stream digital audio via data out 192B and for example, serial-in-to-parallel-out registers 182A, where a digital-to-analog converter (DAC) may generate an analog signal for a coupled speaker.

In some example embodiments, the loop may be used to determine how many (or if any) extension devices 125 and the like are coupled at USB Type-C connector 118, connector 119, and the like. This determination may be performed by for example measuring the quantity of shift registers and/or the corresponding register length in the loop.

In some example embodiments, host 105 may shift data, such as a test bit pattern, into registers 182A-D when no device is coupled at USB Type-C connector 119. When this is the case, the quantity of shift registers at accessory 119 may be determined based on measurements made of how long it takes the test pattern to travel from data out line 192B to data in line 192E. If an extension accessory device 125 having a USB Type-C connector 127A couples to USB connector 119 as an extension, the quantity of shift registers at accessory 125 may also be also be determined based on measurements made of how long it takes the test pattern to travel around the loop from data out line 192B, registers 182A-B, pin/line 172A, through corresponding registers at extension accessory device 125, pin/line 172B, serial-to-parallel output registers 182C-D, and then data in line 192E. If a third extension device is coupled via USB Type-C to extension 125, then the measured quantity of shift registers may also be used to identify this third device and so forth.

When host 105 determines the configuration with respect to the quantity of shift register pairs and thus corresponding devices using the loop, host 105 may adjust its operations with respect to accessory 110 based on this information. For example, host 105 may adjust how it streams data to accessory 110 and how it receives data input from accessory device 110. Moreover, accessory extension 125 may also be configured accordingly before moving to normal operations.

Figure 2B:
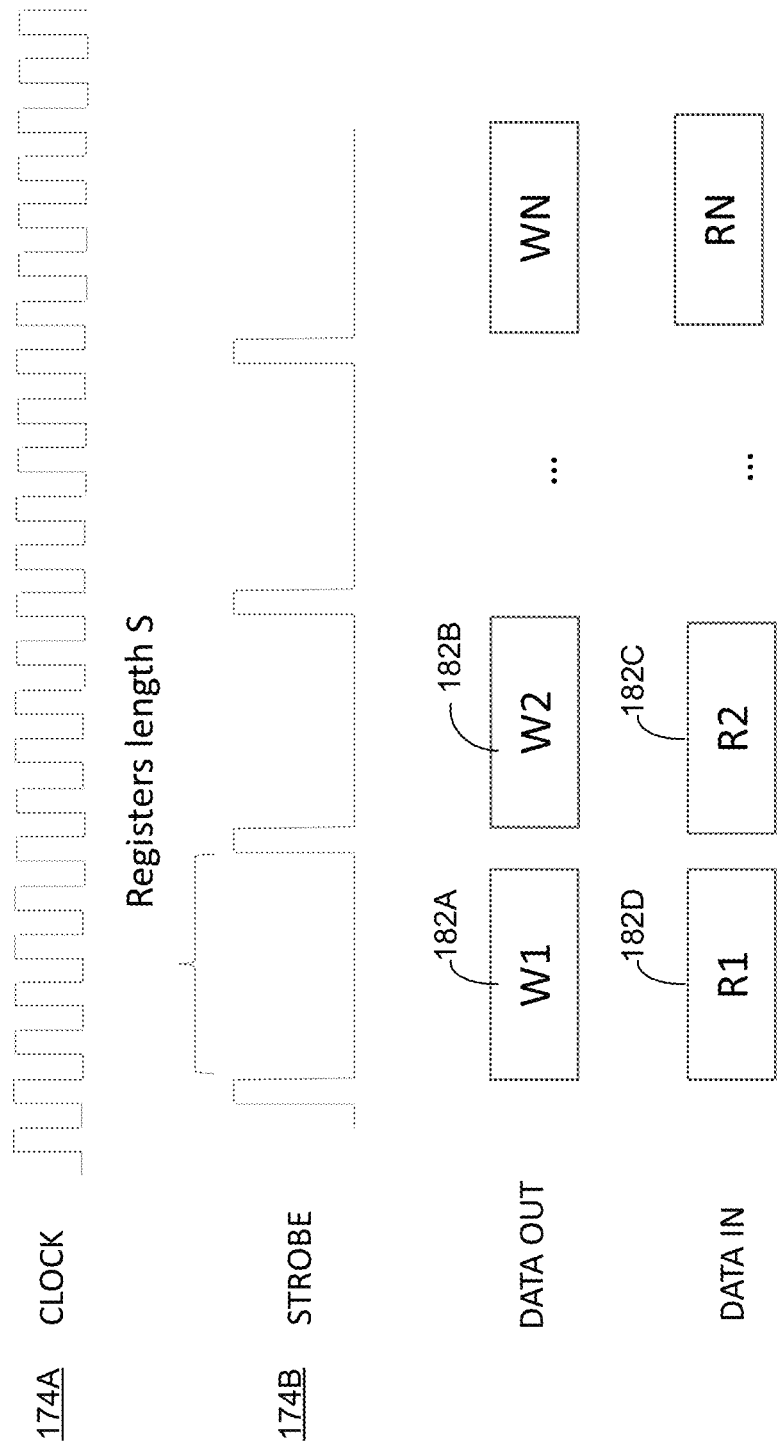
FIG. 2B depicts an example of a signaling diagram for the accessory device of FIG. 2A, in accordance with some example embodiments.

FIG. 2B depicts an example of a signaling diagram including a clock signal 174A provided at clock line/pin 192C and a strobe signal 174B provide at strobe pin/line 192D, in accordance with some example embodiments. The clock signal 174A and strobe signal 174B may be provided to connector 118 by host 105, when coupled thereto. The strobe signal 174B may be used to strobe a shift register to read from input registers/buffers 169C-D and/or write to output buffers/registers 169A-B. Each of the shift registers 182A-D may have a bit length, S (for example, an 8-bit serial-to-parallel shift register, a 16-bit serial-to-parallel shift register, and so forth).

In the example of FIG. 2B, the clock signal shifts bits through the shift registers, and read/write may be enabled by the strobe. If the register length is for example 8 bits, the strobe signal may be enabled after every eighth bit. By running the test bit pattern, the total length in bits, K, is determined. In some example embodiments, there may be a predetermined quantity of valid lengths and related rules to where the ports in and out are in every length pattern/alternative. Once the register length is known, host 105 may determine where a control bit should be sent to trigger an open (or close of the expansion switch 184). For example, a predetermined bit pattern may then be written to the expansion switch 184 to open, and the test bit pattern (which is used to determine register length) may be repeated to determine whether the register length, K, increased indicating an extension device. This process may be repeated to detect additional extension devices until an open loop end is detected (indicating that there is no other extension device coupled). In this way, the accessory device may be dynamically added or removed to the loop, and the host 105 may be configured to stream data to these accessory devices.

Figure 2C:
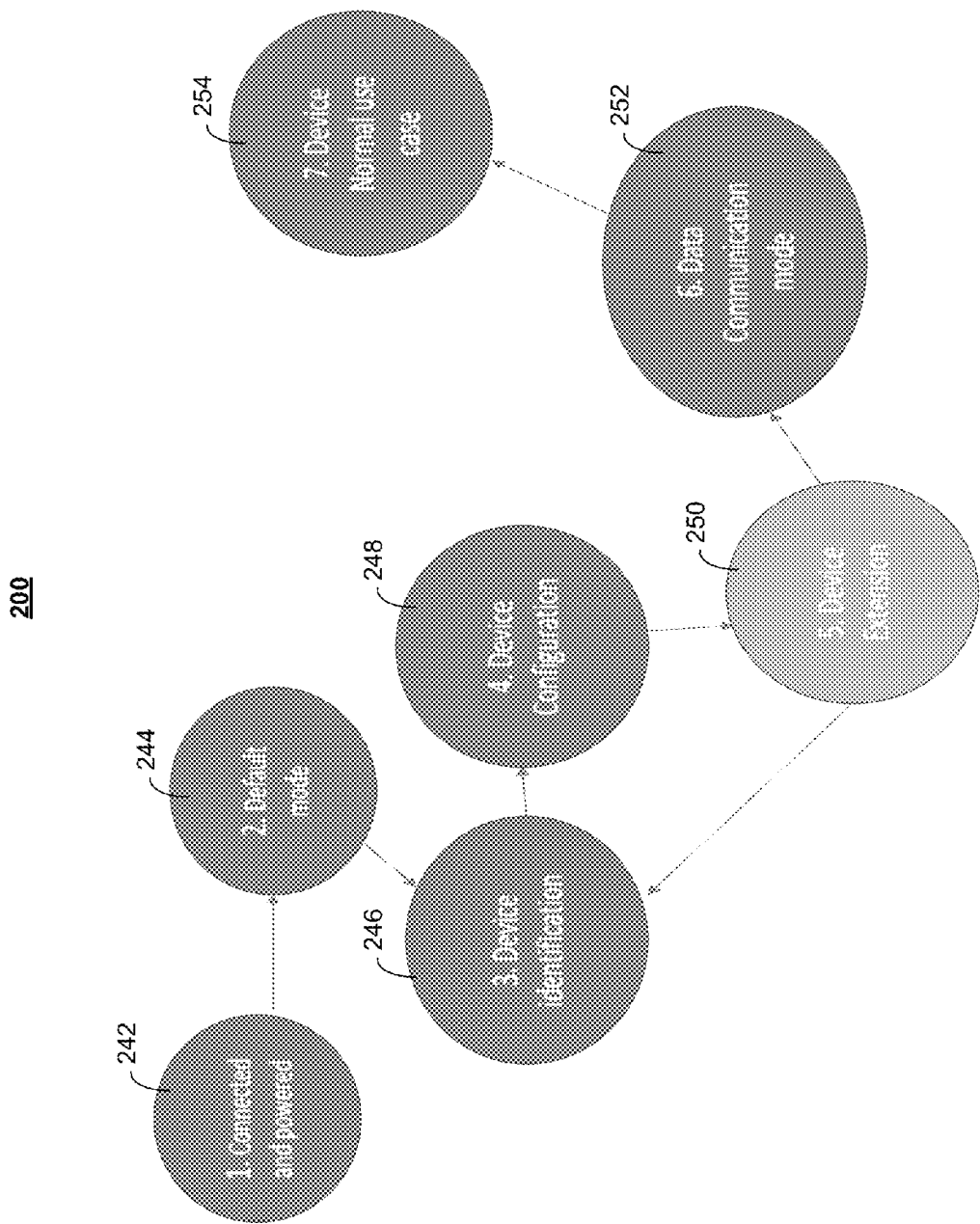
FIG. 2C depicts an example process, in accordance with some example embodiments.

FIG. 2C depicts a process 200 for operating, in accordance with some example embodiments. The description of FIG. 2C also refers to FIGS. 1 and 2A.

At 242, accessory 110 may identify itself to host device 105, in accordance with some example embodiments. For example, accessory 110 may indicate to host 105 that accessory 110 is in a special docking mode 112, as noted above. In the example of FIG. 2A, control pins 192G-H may be used to signal to host 105 the special docking mode 112, although other pins may be used to signal special docking mode 112 to host 105. Accessory 110 may, at 242, also detect when the power is present at for example VBUS 192A. In some example embodiments, connection detection may be performed via CC pins (configuration channel) 192G-H.

At 244, accessory 110 may, in response to the special docking mode 112, enter a default mode, in accordance with some example embodiments. For example, switch 184 may be triggered closed and shift registers 182A-D may be disabled (for example, strobe 192D may be set low by host 105 to disable shift registers 182A-D).

At 246, accessory 110 may then enter into a device identification mode, in accordance with some example embodiments. During the device identification mode, host 105 may determine the quantity of shift registers (or the length of the chain of shift registers in one or more accessories) being used on the loop coupled to data out 192B and data in 192E. Moreover, this determination may, as noted above, also determine how many, and if any extension devices have coupled to accessory 110, which extends the loop.

To determine the quantity of shift registers (or the length of the chain of shift registers), host 115 may, in some example embodiments, provide a clock signal 174A at clock 192C. Next, host 105 may, in some example embodiments, write a predetermined test bit pattern to data out line 192B, and may monitor data in line 192E. Host 105 may measure, in some example embodiments, the quantity of clock cycles of clock signal 172A that elapses between when the predetermined test bit pattern is written to data out 192 and when it returns to data in at 192E.

The time (or quantity of clock cycles) between when the test pattern is written to 192B and received at 192E defines an overall length, K, in bits of the one or more shift registers on the loop. The number of shift registers may be a function of the length in bits of each shift register. Suppose for example K is 48, there might be 6 shift registers when each register has a bit length of 8 bits, 3 shift registers when each register has a bit length of 16 bits, and so forth. To calculate the individual register length S, one or more of the following rules may be applied in some example embodiments: write and read shift registers 182A-D may be configured in pairs; write and read shift registers 182A-D may also each be configured to have the same length in bits; the number of possible registers pairs may be selected as a minimum; or the possible shift register lengths are $S=2^i$ (i=an integer). To illustrate further, if the measured shift register length (or chain length) is measured as K equal to 96, the number of register pairs is K/2=48. The possible quantity of registers is 6 pairs (given that the individual shift registers have a length of S equal to 8) or 3 pairs of shift registers (given that the individual shift registers have a length of S equal to 16). If the calculated number of register pairs yields a number that is not a whole number, such as 1.5, this may indicate an error. In this example, host 105 may determine 3 pairs of shift registers each having 16-bit length, although other quantities may be used/determined as well. In some example embodiments, the number of pairs of shift registers is predetermined to one or more quantities, so knowing the value of K may be a selection based on the one or more predetermined quantities.

At 248, a device configuration mode may be implemented, in accordance with some example embodiments. At this point, the quantity of shift registers, such as shift registers 182A-D, and the individual length of each shift register may be known. Returning to the previous example, there may be 3 pairs of registers each having a 16-bit length. The host 105 may then activate the shift registers via strobe signals 174B via strobe line 192D in order to read and/or write from the shift registers. The strobe signal 174B may thus feed data from input registers to data in line 192E. During the device configuration, mode switch 184 may be kept closed.

At 248, host 105 may also search for configuration pattern information from input data, in accordance with some example embodiments. For example, a configuration register may send predetermined (or agreed) pattern(s) and number of followed configuration data slots (each S) as part or configuration pattern. Configuration data may be several register slots long. For example, suppose the first slot is S1, it may include an identifier (for example a configuration pattern having a certain sequence of bits), and an indication that next three slots will have more data to be read; then as slots S2,S3, and S4 are read, the total needed information for understanding the configuration may thus be contained slots S1,S2,S3, and S4. Although slot S1 may include sufficient data to understand the device's configuration.

At 248, host 105 may also read configuration data which may consist of: a device unique identifier (unique to for example a device category, or a vendor, or a device); each register's purpose (for example, audio left, audio out, keys, display, and the like); each register's specification (for example, bit content, or 16 bit audio, or USB video, and the like); and/or system specific configurations, such as performance requirement parameters (for example, data speed, bus clock frequency, and the like), system communication scheme (for example, simple, duplex, and the like) and frame structure (for example, read/write duty cycle and the like), and/or allowed extensions/configurations. This configuration data may be read or provided by a memory coupled to the loop, although it can be read or provided in other ways as well.

Figure 3A:
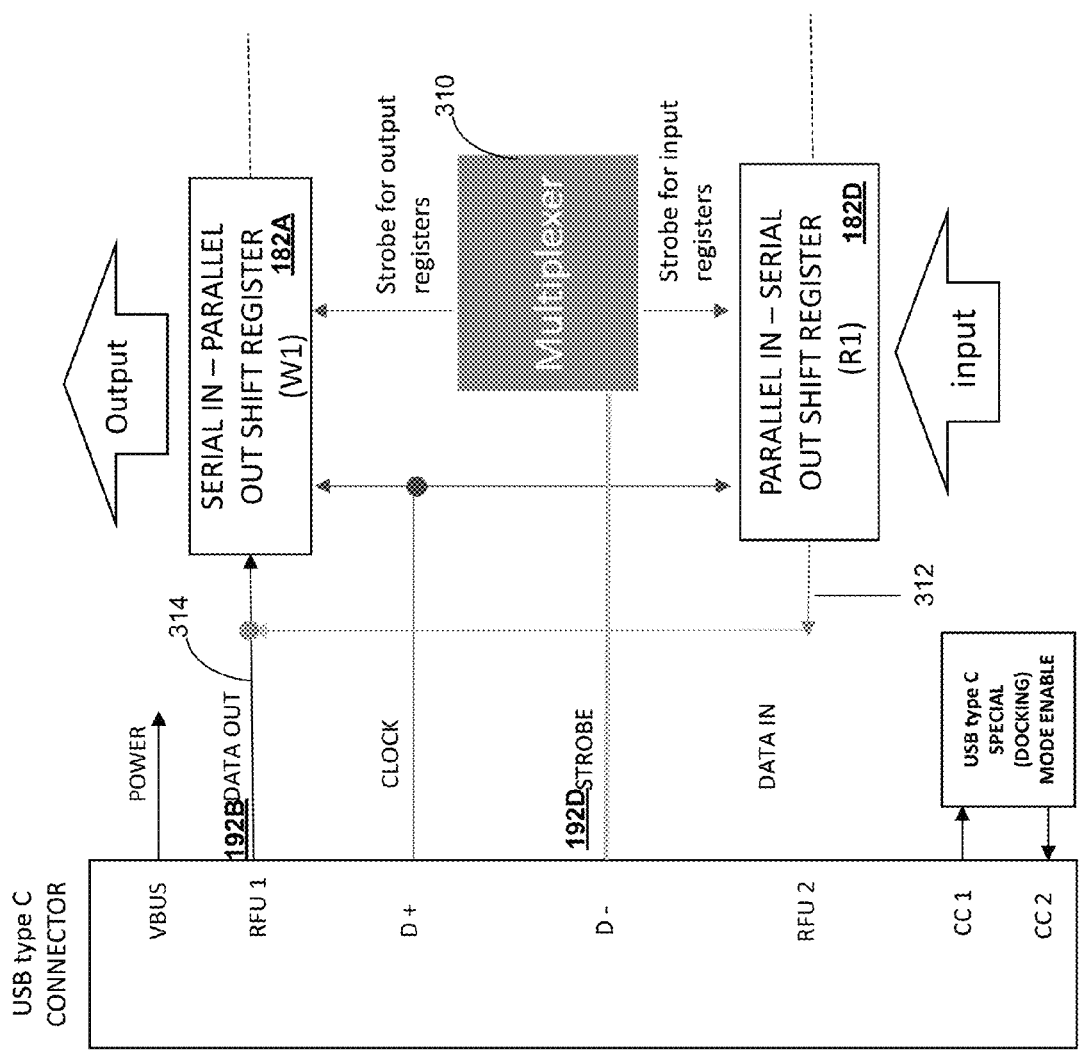
FIG. 3A depicts an example of an accessory device configured in a simplex mode, in accordance with some example embodiments.

Moreover, at 248, the device configuration mode may, in some example embodiments, initiate a request to change from duplex communication to simplex communication to share a single line for data in and data out as shown at FIG. 3A.

Figure 3B:
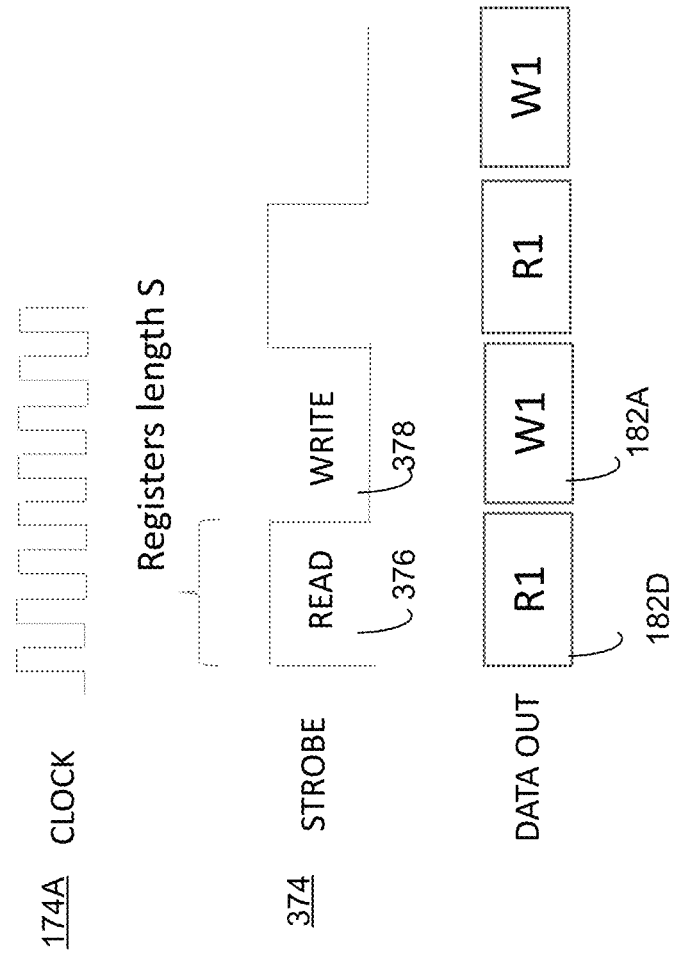
FIG. 3B depicts an example of a signaling diagram for the accessory device of FIG. 3A, in accordance with some example embodiments.

FIG. 3A depicts an example implementation of accessory 110 which has been configured to support simplex operations, in accordance with some example embodiments. In the example of FIG. 3A, the data out line 192B serves to provide data to register 182A and serves to receive data from register 182D. Access to line 192B may be controlled by at least strobe 192D and multiplexer 310, which selects which register should be strobed to read or write to line 192B. FIG. 3B depicts a signaling diagram, in accordance with some example embodiments. At 376, the strobe is high, so the register 182D reads data and places it on line 192B, and at 378 the strobe goes low, signaling that writing should occur (register 182A write data from line 192B to its output register).

Referring again to FIG. 2C, the device extension mode may, at 250, be implemented, in accordance with some example embodiments. Specifically, host 105 may detect connected extension devices, such as device 125, during mode 250. For example, host 105 may repeat the identification mode procedure in a manner similar to that noted at 246 but with some differences. Specifically, switch 184 may be kept open, while keeping strobe signal 174B low at 192D. When an extension device 125 is coupled at 119, the effective shift register length (which is combination of accessory device 110 and extension device 125) may be longer than when measured at 246. If extension is detected, then the configuration at 248 may also be performed, but there will be a configuration pattern for two different register locations, and two different sets of configuration data to be obtained. Alternatively or additionally, the extension may be detected from an extension port pin signal, after which the identification mode (at 246) and configuration mode (at 248) may be repeated.

At 252, a device communication mode may be implemented, in accordance with some example embodiments. In this mode, clock frequency and other signal timing parameters may be set by host 105 in order to meet system performance parameters (for example, bandwidth for audio or video streaming from host 105 to a certain register, clock frequency, and digital waveform parameters for controlled electromagnetic control performance). Protocol adaptation and tunneling to device registers may be adjusted as well.

At 254, a normal operating mode may be implemented, in accordance with some example embodiments. At this point in the process, host 105 may implement a given normal use case, which refers to an operating mode, such as streaming audio to a digital headset, receiving digital audio from a microphone or audio source, and any other operations.

Figure 4:
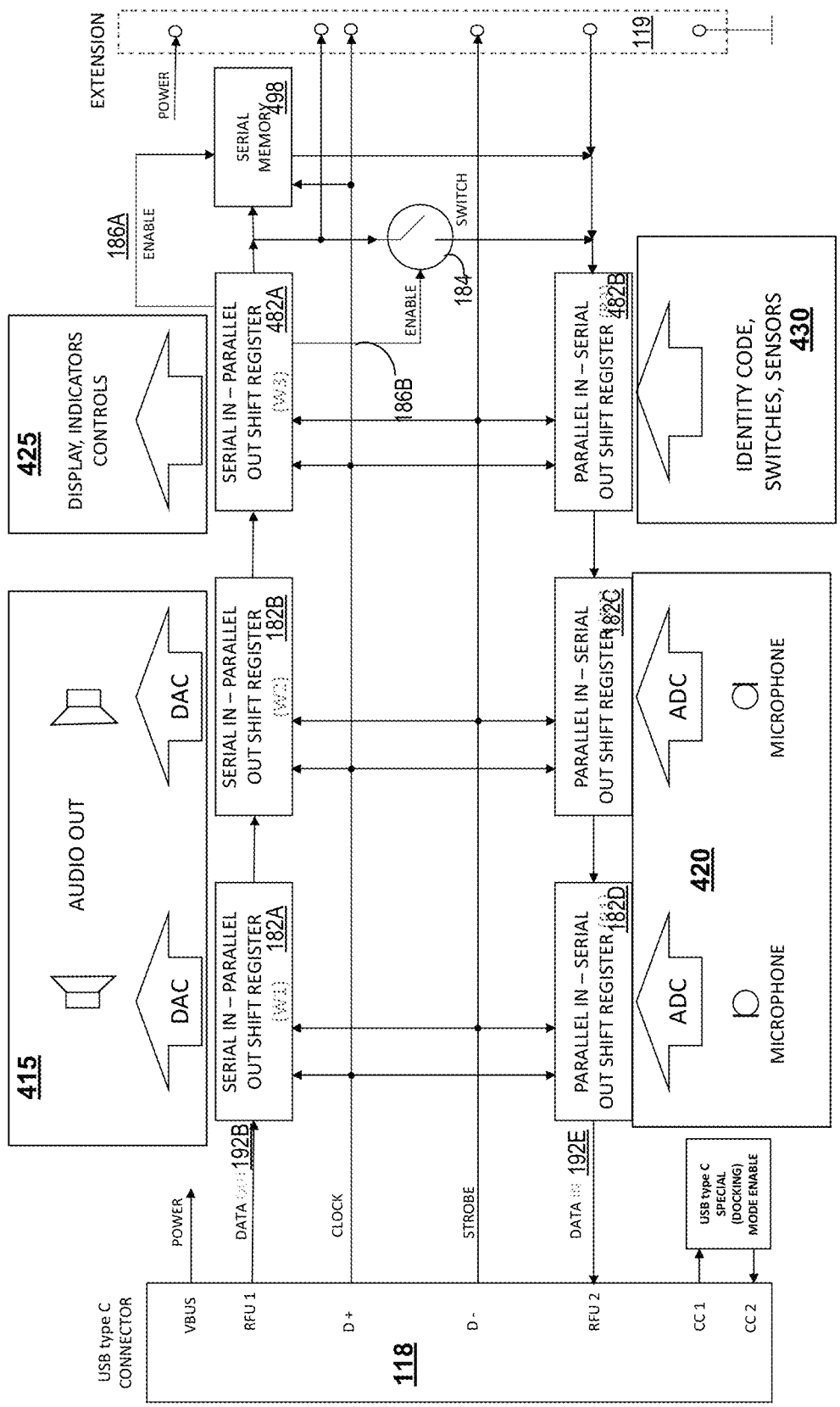
FIG. 4 depicts another example of an accessory device, in accordance with some example embodiments.

FIG. 4 depicts an example of an accessory 410, in accordance with some example embodiments. Accessory 410 is similar to accessory 110 in some respects but includes three pairs of shift registers, each of which may be 16 bits (although other register lengths may be used as well).

In some example embodiments, accessory 410 may include digital audio circuitry 415 to receive for example digital audio (for example, stereo audio and the like) streamed by host 105 via data out line 192B and shift registers 182A-B. Accessory 410 may also include digital audio input circuitry 420 to provide a digital audio stream (for example, from a microphone or other source) to host 105 via shift register 182C-D and data in 192E. The accessory 410 may also include output circuitry 425 to provide display, indicators, and other controls. Output circuitry 425 may be coupled to data out 192B and shift registers 482A. The accessory 410 may also include input circuitry 430 to provide sensor inputs, identity codes (which identify the accessory itself or accessory type), and the like. Input circuitry 430 may be coupled to data in 192E and shift register 482B. In some example embodiments, certain register positions may have predetermined functions, such as registers 182A for speaker left, register 182B for speaker right, and so forth. Referring to FIG. 4 at 119 and 498 for example, the serial memory 498 may be physically inside the accessory but logically treated as if it were an external accessory coupled to interface 119.

Accessory 410 may implement device authentication using serial memory, which may be internally connected to appear as an extension device. Accessory 410 may also be configured to support key event and user interface output indications, as well as simplex and/or duplex data communications. The key event may represent an event or trigger from the accessory user interface (for example, via a key or button). The accessory may show user interface indications based on data provide from the host (for example, turn LEDs on/off or display data). The accessory may implement two-way communication (for example, duplex) as shown for example at FIG. 2A through interfaces 192B (data out) and 192E (data in), but after a configuration phase, only one data line/interface may be used as well for data in/data out. When this is the case, the communication may be time multiplexed between reading and writing (simplex) as shown in FIG. 3A. The loop (including the extended loop in device 125) may, in some example embodiments, be coupled to serial memory 498, where a description of the accessory type and other parameters may be accessed and provided to for example host 105 via the loop.

In some example embodiments, host 105 may send a predetermined pattern of bits to trigger the opening of memory 498 or to trigger the extension switch 184. The identification code of extension device or content of memory may be received by host 105. This phase may be repeated until there are no further extension devices/memories to be read. The memory can include further information about the accessory.

In some example embodiments, two differential pairs of a USB Type-C interface may be used as separate signals to produce a relatively low audio transfer clock and data for an accessory, such as a headset. This may be performed in a slew-rate control mode to minimize emitted electromagnetic interference (EMI). Alternatively or additionally, two differential pairs (docking mode) may be used, so that one pair provides a relatively low audio transfer clock and the other pair carries the audio data. Alternatively or additionally, a differential pair may be used for a relatively low audio clock and individual signals of another USB Type-C connector differential pair may be used for data and strobe, or for data out and return data in. With this arrangement, one could create an accessory, where both audio data and control commands, in and out could be run with relatively low power and relatively low cost, while having very low delay in the audio path.

In some example embodiments, the signaling bits for audio and data may be in accordance with a data format that is compliant with a standard (for example, SPDIF) to allow interfacing between home audio systems, pro-audio systems, and the like via optical and/or galvanic mechanisms.

Referring to FIG. 4 at the two control bits, switch enable 186B and serial memory enable 186A, the locations of these control bits may be predetermined for a given total loop length K. Thus, when the host has determined K, it knows the locations of the control bits and is able to activate switch 184 or serial memory 498.

In some example embodiments, the loop noted above may be configured to have different lengths by simply coupling additional accessories, which triggers for example detecting the shift registers, reading accessory type, setting configuration parameters and then reconfiguring the loop to receive audio data and commands.

In some example embodiments, FIG. 4 may be configured in other ways. For example, the first shift register(s) 182A-B may support a microphone and keys (display) module with data memory option connected to the host 105 or a device. When this is the case, another USB Newark female connector for next accessory, such as a headphone. As such, there may be two connected extensions to FIG. 2A at interface 119. The first may be a serial memory (embedded inside accessory) and another may be an audio headphone, which can physically be taken on and off and which can provide audio output through output serial registers to acoustics domain conversion. The serial memory may take an input word (register length S) from data output line 192B and provide data to input to data input line 192E on strobe signal. Serial memory may be an effective way to implement serial registers input/output structure, and may allow additional implementation freedom for accessory. The serial memory may also provide authentication, such as an encryption key in/out, and the serial memory may also store any configuration data, and may also be programmed while accessory is used (dynamic accessory structure).

The connectors, such as 118, 119, and the like, may be 3.5 mm plugs or any other standard physical accessory interface. Once an input of a second accessory, such as extension 125, is detected, a common clock may be fed to the second accessory and the data loop may be extended into the second accessory.

Figure 5:
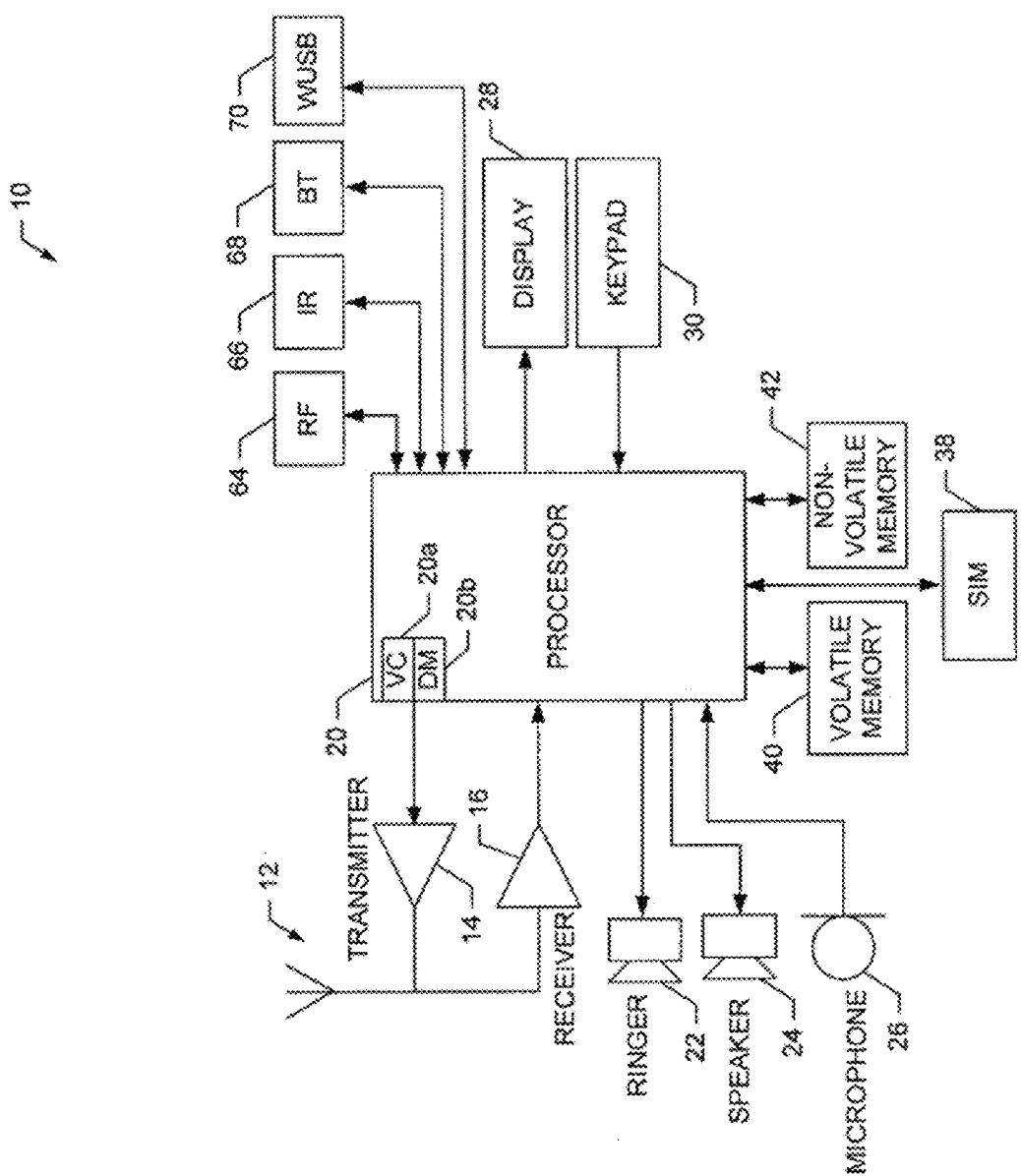
FIG. 5 depicts an example of a user equipment, in accordance with some example embodiments.

FIG. 5 illustrates a block diagram of an apparatus 10, in accordance with some example embodiments. For example, apparatus 10 may be implemented at host 105, accessory 110, and/or an extension device 125. The apparatus including the host, accessory, and/or extension device may also comprise user equipment, such as a smart phone, a source of audio (for example, a microphone and the like), a sink of audio (for example, a speaker), a microphone, a headset, a digital headset, a television, a tablet, and/or any other device.

The apparatus 10 may, in some example embodiments, include at least one antenna 12 in communication with a transmitter 14 and a receiver 16. Alternatively transmit and receive antennas may be separate.

The apparatus 10 may, in some example embodiments, also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to perform one or more of the operations disclosed herein with respect to the host, accessory device, and/or extension device. The memories may comprise an identifier, such as an international mobile equipment identification (IMEI) code, capable of uniquely identifying apparatus 10. The functions may include one or more of the operations disclosed with respect to host, accessory device, and/or extension device including one or more aspects of the process at FIG. 2C. The memories may comprise an identifier, such as an international mobile equipment identification (IMEI) code, capable of uniquely identifying apparatus 10. In the example embodiment, the processor 20 may be configured using computer code stored at memory 40 and/or 42 to perform one or more of the operations disclosed herein including process 200.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is a low power and/or low EMI digital accessory. Without in any way limiting the scope, interpretation, or application of the claims appearing below, another technical effect of one or more of the example embodiments disclosed herein is relatively thin cables. Without in any way limiting the scope, interpretation, or application of the claims appearing below, another technical effect of one or more of the example embodiments disclosed herein is scalability via daisy chaining of accessories.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments may comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   sending, by a user equipment, a first predetermined test pattern to a first accessory including a first connector, when the first accessory is in a first mode of operation;
   determining, by the user equipment, a configuration of the first accessory in the first mode by at least measuring a first time for the first predetermined test pattern to return from the first connector and a data loop at the first accessory;
   sending, by the user equipment, a second predetermined test pattern via at least the first connector; and
   determining, by the user equipment, a presence of a data loop extension, by at least measuring a second time for the second predetermined test pattern to return from the first connector and at least one of the data loop at the first accessory or the data loop extension comprising a second data loop at a second accessory coupled to the first accessory.

2. The method of claim 1, further comprising:
   determining an extension control position at the data loop of the first accessory; and
   sending at least one control bit to the extension control position to enable extension of the data loop at the first accessory to the data loop extension.

3. The method of claim 2, wherein the extension control position is determined based on the measured first time.

4. The method of claim 1, wherein the data loop extension comprises a memory at the first accessory, and wherein the memory comprises information about the first accessory.

5. The method of claim 1, wherein the first connector comprises a universal serial bus Type-C connector.

6. The method of claim 1, wherein the first mode comprises a special docking mode.

7. An apparatus comprising:
   at least one input shift register;
   at least one output shift register, wherein the at least one input shift register and the at least one output shift register are coupled to a first connector; and
   at least one switch configured to feed data from the at least one input shift register to the at least one output shift register when the at least one switch is in a first state, the at least one switch configured to feed data from the at least one input shift register to an extension output when the at least one switch is in a second state, wherein the at least one switch is controlled based on at least one bit at an extension control position at the at least one input shift register, the at least one output shift register, or a combination thereof.

8. The apparatus of claim 7, wherein the extension output is coupled to a memory comprising information about the apparatus, and wherein the memory is further coupled to the at least one output shift register.

9. The apparatus of claim 7, wherein the extension output is coupled to a second connector.

10. A non-transitory computer-readable storage medium including computer program code, which when executed by at least one processor causes operations comprising:
   sending a first predetermined test pattern to a first accessory including a first connector, when the first accessory is in a first mode of operation;
   determining a configuration of the first accessory in the first mode by at least measuring a first time for the first predetermined test pattern to return from the first connector and a data loop at the first accessory;
   sending a second predetermined test pattern via at least the first connector; and
   determining a presence of a data loop extension, by at least measuring a second time for the second predetermined test pattern to return from the first connector and at least one of the data loop at the first accessory or the data loop extension comprising a second data loop at a second accessory coupled to the first accessory.

* * * * *